Feb. 16, 1932.    E. F. SAYLOR    1,845,629
STOP JOINT FOR LEAD COVERED CABLES
Filed Feb. 28, 1930
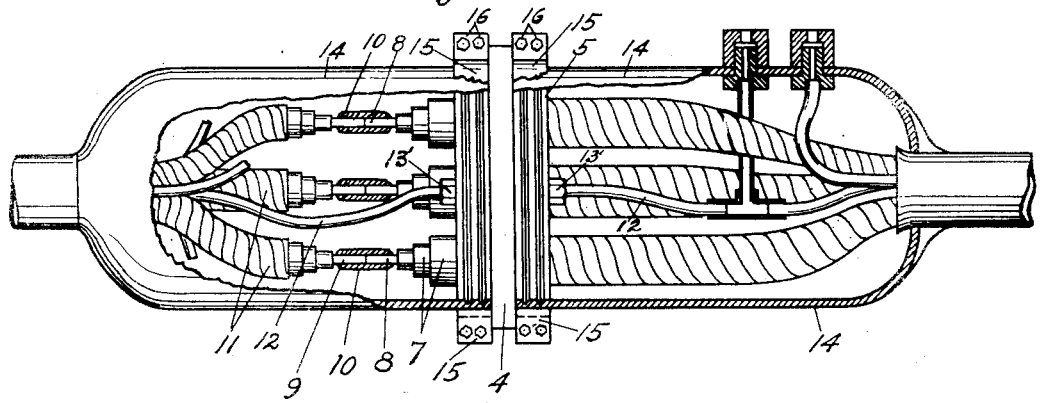
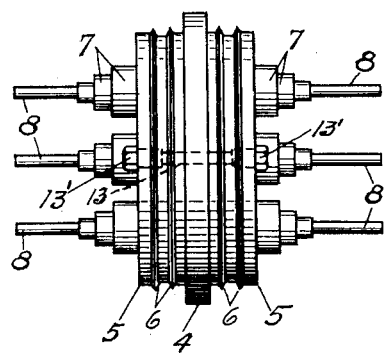
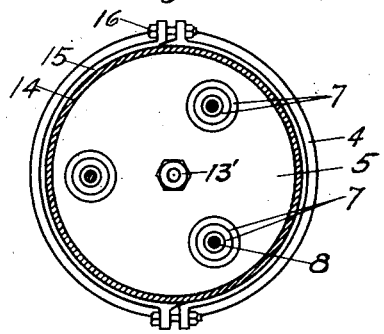
Ernest F. Saylor,
Inventor.
Attorney.

Patented Feb. 16, 1932

1,845,629

UNITED STATES PATENT OFFICE

ERNEST F. SAYLOR, OF LOS ANGELES, CALIFORNIA

STOP JOINT FOR LEAD COVERED CABLES

Application filed February 28, 1930. Serial No. 432,117.

My invention relates to stop joints for lead covered cables, and more particularly to a stop joint which will serve as an insulating division or joint between the lead coverings of two adjacent cable sections, and which will be complete and self contained and which can be used to connect two ends of high voltage cables and make provision for the usual supply of insulating oil or fluid which is supplied under force to such cables.

For the proper functioning of these high voltage cables electrically, it is essential that the metal tubes of one cable section, between stop joints, shall be insulated from the tubes of the adjoining cable section. I have provided a new type of stop joint for this purpose and it differs from any other known to me in that it is a complete, self-contained joint or connection made of insulating material, with the connecting short sections of cable formed and secured therein and therethrough ready to be connected at each side of the joint body or member to the cables in the cable sections at each side of such joint. I have so formed this integral joint or body member that it forms a distinct division or partition, a portion of which extends beyond the diameters of the lead sheath or covering, with portions at each side to telescope into and be connected into the adjacent ends of the two sections of lead covering, the two ends of the lead sheath or covering being clamped around my insulating body, at opposite sides of the middle partition portion, with suitable clamping means.

In order to explain my invention more fully, I have illustrated one embodiment thereof on the accompanying sheet of drawings which I will now describe.

Figure 1 is a side elevation of a stop joint, partly in section, showing my invention;

Figure 2 is a side elevation of the joint body or member complete and removed from the cable line; and Figure 3 is an end view of the member shown in Fig. 2, from the left and showing also the clamping member thereon, with the lead sheath indicated in section.

Referring now more in detail to the drawings, my invention as illustrated, includes a joint body member having the middle portion 4, with the extensions, 5, 5, at each side, said extension portions being provided with ridges 6, 6, therearound. Also formed as a part of said body are boss-like extensions, 7, 7, in which are secured short sections of conductor rods or cable sections 8, 8, adapted to be spliced to the main cable lines, 9, 9, Fig. 1, by means of joint members 10, 10, before the insulating wrapping 11, 11, are wound thereon, as clearly indicated in Fig. 1. The rods 8 on the right side of Fig. 2 are connected with the rods 8 on the left side thereof. In these cables it is common to fill the same with insulating oil or other suitable fluid and in order to make provision for this, I provide the joint body with holes therethrough, designated 13, with connecting members 13' at each end for connecting the two ends of the small tubes 12 thereto, as shown, thus preventing the extension of metal through said joint body.

The lead sheaths, designated 14, 14, are telescoped over the extensions 5, 5, as shown, and are securely clamped around said extensions 5, 5, at the opposite sides of the middle portion 4, by means of two clamp rings 15, 15, having the bolts 16, 16, as is clear from Figs. 1 and 3.

Thus it will be seen that my improved joint and connecting member, connects the lead sheaths together, but insulates them from each other, and it also provides the connecting short sections of cables or rods 8, 8, for connecting the cables proper, before the insulating wrappings 11, 11, are applied thereto, and while permitting perfect connection for the cable sections proper, the cable covering sections are separated and insulated from each other, while at the same time forming strong connections for the two adjacent ends of the lead coverings for the cables.

This joint or connecting member is formed of any suitable insulating material, such as porcelain or other suitable material and is molded or formed to meet the requirements of the cable to be joined.

I do not limit my invention to the details of construction and arrangement shown for descriptive purposes, except as I may be limited by the hereto appended claims.

I claim:

1. A stop joint for cables including a joint body of insulating material having a middle portion of one diameter, reduced in diameter at opposite sides thereof to receive telescopically the sheath coverings, clamp rings around said sheath coverings at opposite sides of said middle portion, and cable sections through said joint body and forming a part thereof and projecting therefrom for connection to the main cables.

2. A stop joint for cables including a joint body of insulating material having a middle portion of one diameter, reduced portions at opposite sides thereof to receive telescopically the sheath coverings, said reduced portions having annular ridges formed thereon for indenting the inner surfaces of said sheath coverings, clamp rings around said sheath coverings at opposite sides of said middle portion, and cable sections through said joint body and forming a part thereof and projecting therefrom for connection to the main cables.

3. Means for making a stop joint in cables consisting of an integral joint body of insulating material having cable sections cast therethrough and secured therein, said body having a middle portion of one diameter and portions of reduced diameter at opposite sides thereof, with boss like portions of said body propecting therefrom around said cable sections for insulation winding, and clamp rings adapted for said body at opposite sides of said middle portion for clamping lead sheath coverings thereto and holding them insulated from each other.

4. A stop joint body for plural cables consisting of an integral joint body of insulating material formed with plural cable sections therethrough and projecting from each side thereof for connection to other cable sections, said body having portions at each end to telescope into cable coverings with separating portion around the middle thereof, and means for binding such cable coverings to the opposite ends of said joint body, insulated from each other, and means through said joint body for securing small tubes thereto for free flow of insulating fluid.

5. A stop joint of the character described including an integral joint body of insulating material having a middle portion of larger diameter and two end portions at each said thereof of smaller diameter, said end portions having spaced annular ridges around their surfaces and adapted to indent lead sheath coverings telescoped over said end portions, clamp rings for said two end portions for securing said coverings thereto, short cable sections formed through said joint body and secured therein for connection with other cable sections, and means through said joint body for flow tube connection for liquid insulating matter to be forced into said stop joint around said cables.

Signed at Los Angeles, Los Angeles County, California, this 20th day of February, 1930.

ERNEST F. SAYLOR.